(12) United States Patent
Squires

(10) Patent No.: US 7,017,476 B2
(45) Date of Patent: Mar. 28, 2006

(54) CANNED FOOD DRAINING TOOL

(76) Inventor: Jason A. Squires, 6021 Fountain Pointe, Apt. 5, Grand Blanc, MI (US) 48439

( * ) Notice: Subject to any disclaimer, the term of this patent is extended or adjusted under 35 U.S.C. 154(b) by 77 days.

(21) Appl. No.: 10/716,645

(22) Filed: Nov. 19, 2003

(65) Prior Publication Data
US 2005/0103214 A1    May 19, 2005

(51) Int. Cl.
*B30B 9/06* (2006.01)
(52) U.S. Cl. .......................... 99/495; 99/349; 100/116; 100/234
(58) Field of Classification Search .................. 99/495, 99/506, 349, 507, 508; 100/110, 116, 234; 210/464, 465, 470, 768; D7/666, 676
See application file for complete search history.

(56) References Cited

U.S. PATENT DOCUMENTS

| | | | | | |
|---|---|---|---|---|---|
| 1,073,081 | A | * | 9/1913 | Jacobson | 210/407 |
| 5,272,969 | A | * | 12/1993 | McDonald | 100/110 |
| D433,289 | S | * | 11/2000 | Durbin et al. | D7/666 |
| 6,227,104 | B1 | * | 5/2001 | Watkins, Jr. | 100/110 |
| 6,234,074 | B1 | * | 5/2001 | Mangum | 100/110 |
| 6,745,682 | B1 | * | 6/2004 | Tranberg | 100/110 |

* cited by examiner

*Primary Examiner*—Reginald L. Alexander
(74) *Attorney, Agent, or Firm*—Raggico & Dinnin, P.C.

(57) ABSTRACT

The present invention provides a hinged canned food draining tool that includes first and second arms, and a presser equipped with a magnet for facilitating draining of liquid from canned food via a separated lid of the can. The tool is preferably hinged at ends of the first and second arms, and includes a portion that supports and accommodates a can between ends of the tool arms opposite the ends at which they are hinged.

18 Claims, 4 Drawing Sheets

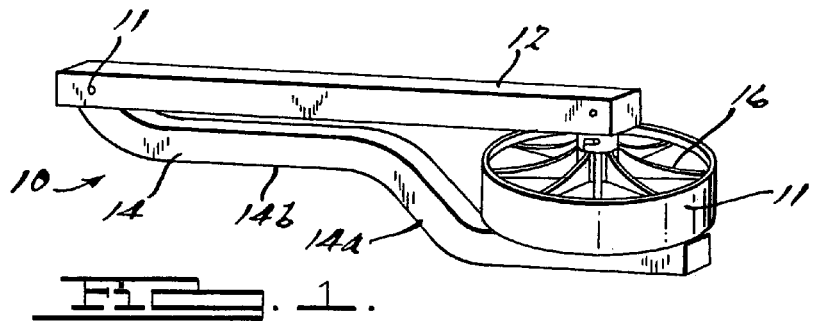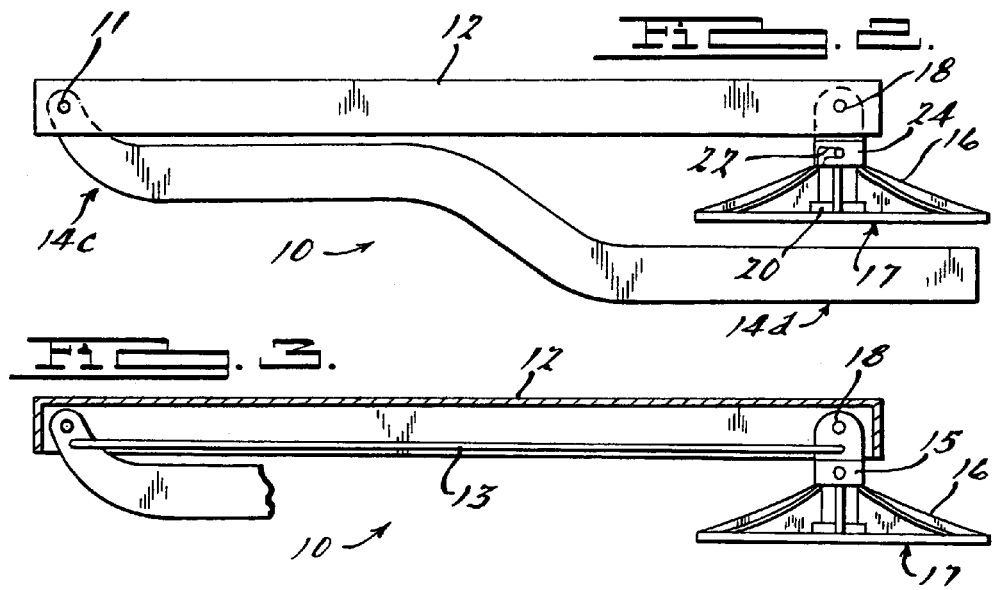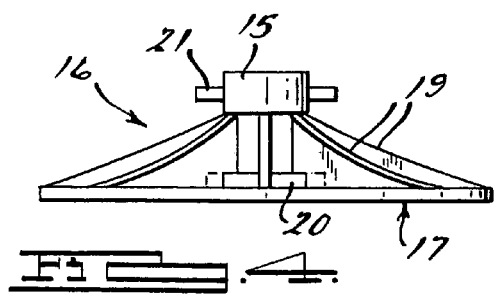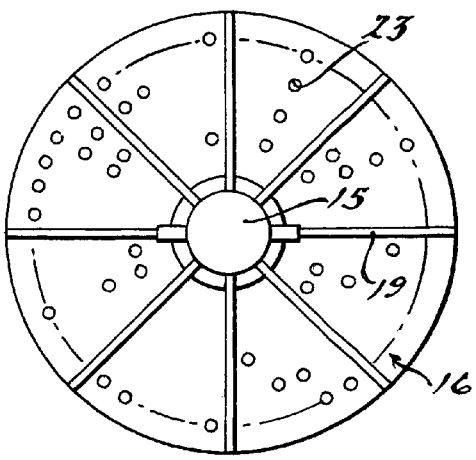

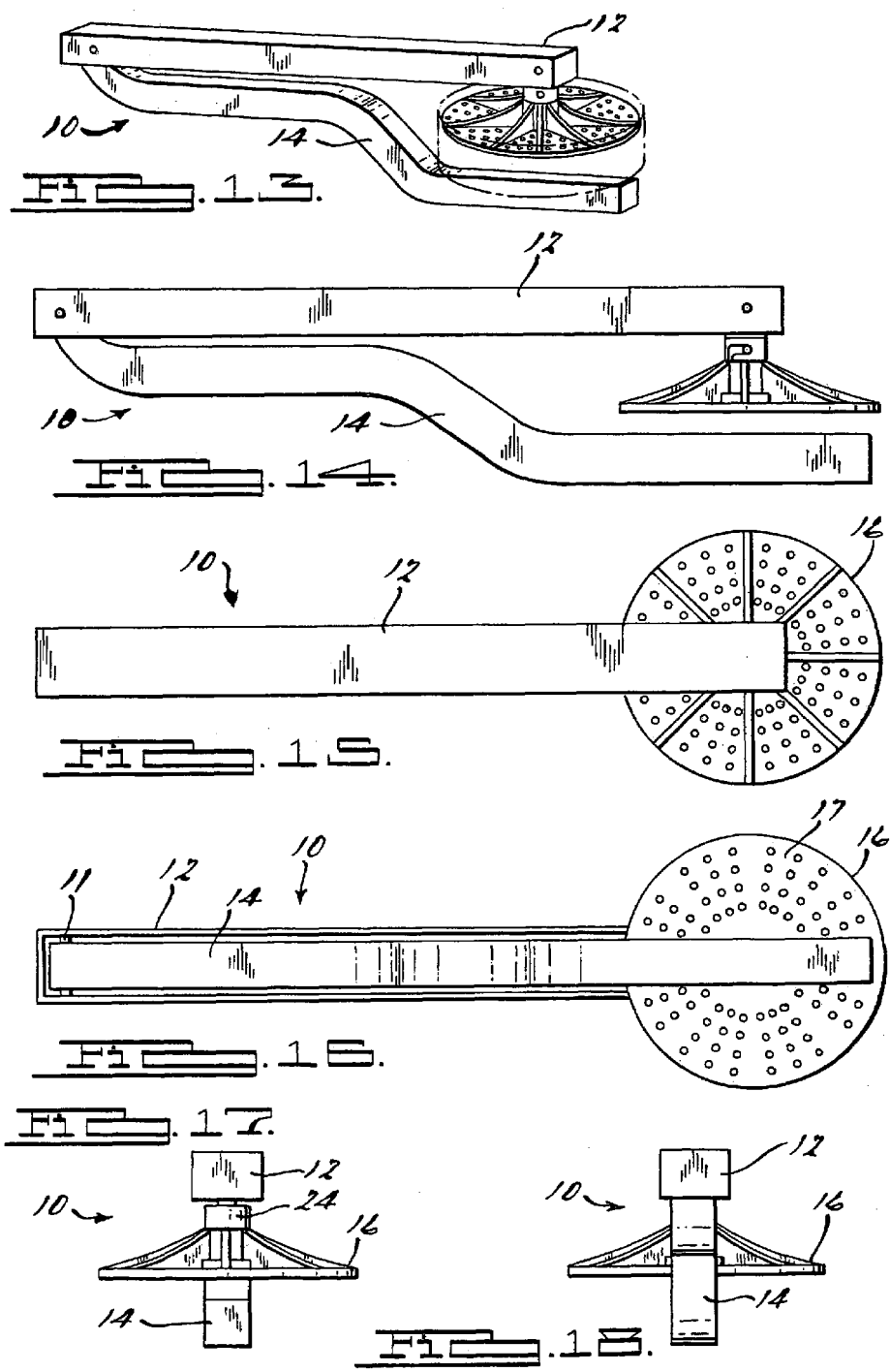

US 7,017,476 B2

CANNED FOOD DRAINING TOOL

TECHNICAL FIELD

The present invention relates generally to food preparation utensils, and more particularly to a tool for draining liquid packed foods.

BACKGROUND OF THE INVENTION

A plethora of kitchen utensils have been known in the art for many years. Can openers, strainers, tongs and similar instruments find broad utility in the modern kitchen. While the speed and efficiency with which packaged foods may be processed in the home kitchen continues to drive technological advances, health and safety, in particular the prevention of biological contamination has increasing importance in the development of kitchen technology.

A particular area of food preparation health and safety relates to the need to avoid soiling one's hands with juices and other packaging liquids for canned food products. This concern relates both to minimizing the contact between a person's hands and food they or others intend to eat, as well as reducing the opportunity for pathogens from a foodstuff to be introduced into another food in the kitchen, or to various surfaces and utensils. In addition to the hygienic advantages of avoiding soiling of the hands, many consumers find sticky, smelly or acidic food packing liquids offensive. It is thus desirable to provide a simple and effective means for draining the liquids from canned foods.

SUMMARY OF THE INVENTION

In one aspect, the present invention preferably provides a hinged canned food draining tool that includes first and second arms, and a presser equipped with a magnet for facilitating draining of liquid from canned food via a separated lid of the can. The tool is preferably hinged at ends of the first and second arms, and includes a support portion that allows a can to be accommodated between ends of the tool arms opposite the ends at which they are hinged.

BRIEF DESCRIPTION OF THE DRAWINGS

FIG. 1 illustrates a perspective view of a canned food draining tool according to the present invention;

FIG. 2 illustrates a side view of a canned food draining tool according to the present invention;

FIG. 3 illustrates a partial sectioned side view similar to FIG. 2;

FIG. 4 illustrates an enlarged view of a presser element adapted for use with the tool of FIGS. 1–3;

FIG. 5 is a top view of the presser foot of FIG. 4;

FIG. 13 illustrates a perspective view of the tool of FIG. 1;

FIG. 14 illustrates a side view of the tool of FIG. 1;

FIG. 15 illustrates a top view of the tool of FIG. 1;

FIG. 16 illustrates a bottom view of the tool of FIG. 1;

FIG. 17 illustrates a front end view of the tool of FIG. 1;

FIG. 18 illustrates a rear end view of the tool of FIG. 1.

DETAILED DESCRIPTION OF PREFERRED EMBODIMENTS

Figure 6:
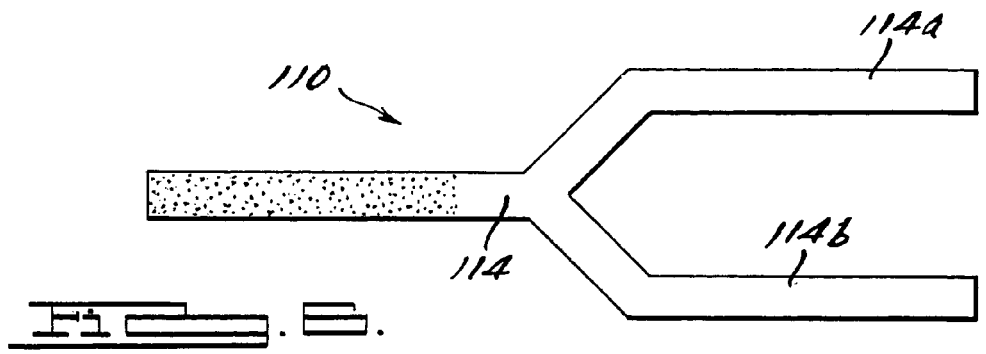
FIG. 6 illustrates one tool arm of a canned food draining tool according to another preferred embodiment of the present invention.

The present invention broadly provides a hinged draining tool for draining the liquid contents of a can. Referring to FIGS. 1–5 there are shown several views of a draining tool 10 according to a first preferred embodiment of the present invention. Draining tool 10 preferably includes first and second arms 12 and 14, which are top and bottom arms, respectively. Top arm 12 may be constructed from any suitable material, and is preferably a substantially rectangular elongate piece, attached to bottom arm 14 at a hinge 11. In a preferred embodiment, hinge 11 hingeably connects top and bottom arms 12 and 14 at proximal ends thereof. A presser 16 is preferably hingedly attached at a distal end of top arm 12, opposite hinge 11. Bottom arm 14 preferably includes a bend 14a that facilitates the placement of a can 11 between top and bottom arms 12 and 14 such that the arms 12 and 14 may be closed together to bring presser 16 into engagement with a lid of can 11. Thus, in a typical operation, wherein a tuna fish can having a height of about one to three inches is drained with tool 10, the relatively short, broad dimensions of the can 11 are appropriately accommodated between arms 12 and 14 such that squeezing together of arms 12 and 14 will bring presser 16 substantially straight downward axially, as defined by can 11.

An arcuate portion 14c also preferably assists in properly orienting arms 12 and 14 such that a flat distal portion 14d of bottom arm 14 is substantially parallel to upper arm 12 when it is about 2 inches from the bottom of presser 16. Arcuate portion 14c preferably has an angle of greater than about 90°. A substantially straight handle portion 14a of bottom arm 14 is preferably used as a gripping portion in conjunction with top arm 12 to exert a squeezing force on can 11 via presser 16. All the component parts of tool 10 are constructed from known materials and by known processes.

Referring now in particular to FIGS. 2 and 3, presser 16 is preferably attached to top arm 12 at a hinge 18, allowing the relative orientation of presser 16 relative to top arm 12 to vary, accommodating different can sizes, as well as accommodating relative displacement between presser 16 and the can itself, as occur during the squeezing of the contents of the subject can. A magnet 20 is preferably provided and mounted on presser 16 such that when presser 16 is engaged with a metallic can lid, arms 12 and 14 can be separated relative to one another, and the can lid (not shown) lifted out of the can after draining of the liquid contents. FIG. 3 illustrates a wire or band 13 positioned internally in top arm 12 that serves to stabilize presser 16 relative to bottom arm 14, across varying angles of attachment of hinge 18. Band 13 is preferably inserted via an open side of top arm 12. In a preferred embodiment, the open side of arm 12 receives a portion of arcuate end 14c of bottom arm 14. A bottom surface 17 of presser 16 preferably engages the can lid.

FIG. 4 illustrates a close up view of presser 16, which preferably includes a head 15 with a set of pegs 21 protruding from opposite sides thereof. Pegs 21 allow a detachable engagement of head 15 with an angled slot 22 in a retainer 24 that is hingedly engaged with top arm 12 at hinge 18. Thus, a variety of presser sizes and configurations are available and adapted to various can sizes. FIG. 5 illustrates a top view of presser 16, wherein a plurality of apertures 23 are formed to facilitate draining of liquid from the can. A plurality of decorative fins 19 are preferably formed on presser 16, and impart structural rigidity as well as a pleasing appearance to the element.

Turning now to another preferred embodiment of the present invention FIG. 6 illustrates a forked bottom arm 114 for use with elements similar to those illustrated with regard to top arm 12 in FIGS. 1–5. The FIG. 6 embodiment 110 is distinct in that bottom arm 114 forks into two additional supporting arms 114a and 114b. It should be appreciated that although the embodiment of FIG. 6 is shown in top view, it is contemplated that arm 114 will have a side profile similar to arm 14, described with regard to FIGS. 1–5, particularity in respect of the curvature thereof. The secondary arms 114a and 114b shown in FIG. 6 provide additional support for a can during draining.

Figure 7:
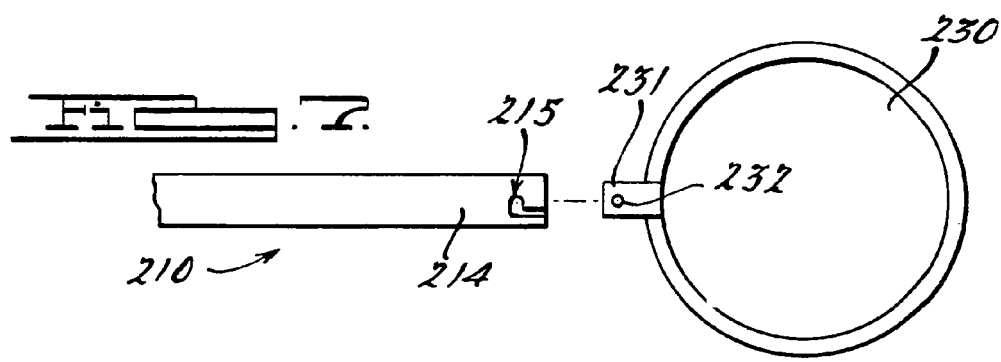
FIG. 7 illustrates a top view of one arm with an interchangeable platform apparatus according to another preferred embodiment of the present invention.

Referring now to FIG. 7, there is shown yet another embodiment of the present invention 210, wherein interchangeable supports 230 are provided and may be detachably engaged with a bottom arm 214. Similar to the FIG. 6 embodiment, the embodiment of FIG. 7 is contemplated for use primarily with elements similar to those described with respect to top arm 12 of FIGS. 1–5. The FIG. 7 embodiment includes a bottom arm 214, with an angled slot 215 formed therein. A substantially circular supporting platform 230 is provided and includes an extension 231 with a peg 232 adapted for detachably engaging platform 230 with arm 214 via an engagement with slot 215. It should be appreciated that alternative means for detachably engaging platform 230 might be used without departing from the scope of the present invention.

Figure 8:
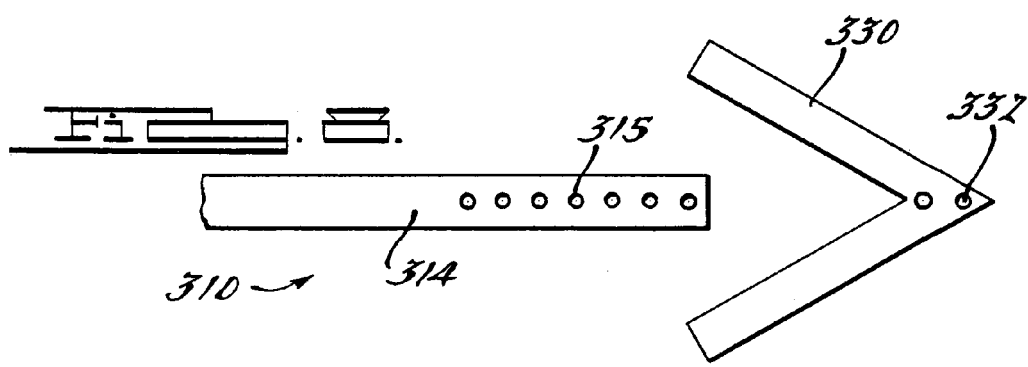
FIG. 8 is a top view of one arm of a canned food draining tool according to another preferred embodiment of the present invention.

Turning now to FIG. 8, there is shown yet another embodiment of the present invention 310, wherein an angular, V-shaped, supporting platform 330 is engageable with a bottom arm 314 via an engagement of a plurality of pegs 332 on angular supporting platform 330 with substantially mating apertures 315 in bottom arm 315. Alternative embodiments are contemplated wherein arm 314 includes pegs and platform 330 includes apertures.

Figure 9:
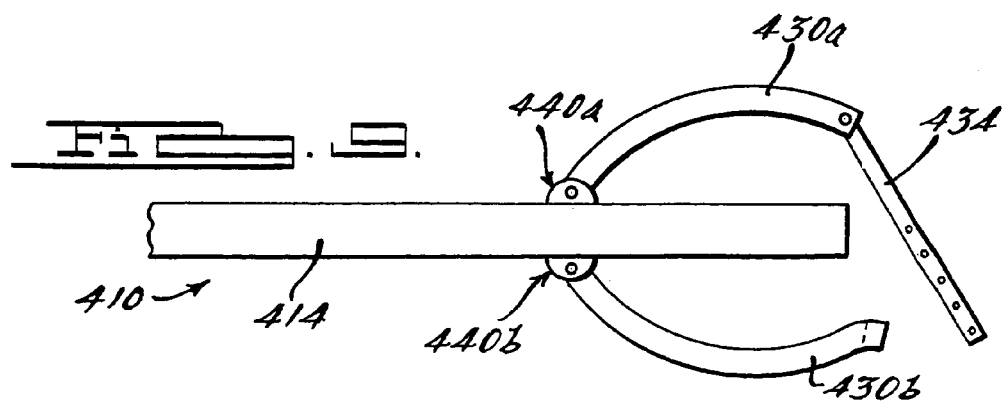
FIG. 9 is a top view of one arm of a canned food draining tool according to another preferred embodiment of the present invention.
Figure 10:
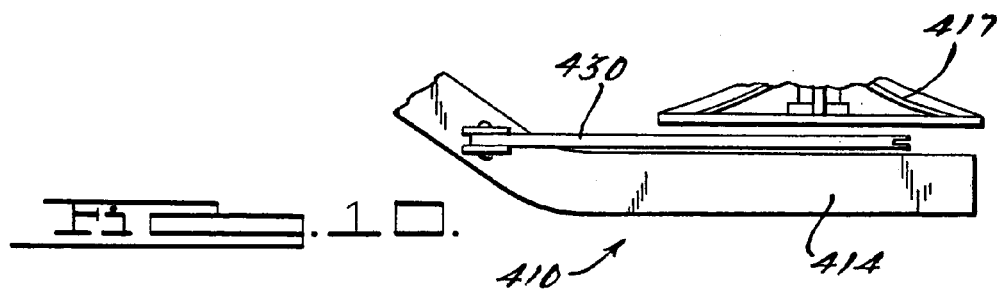
FIG. 10 illustrates a partial side view of the tool shown in FIG. 9.
Figure 11:
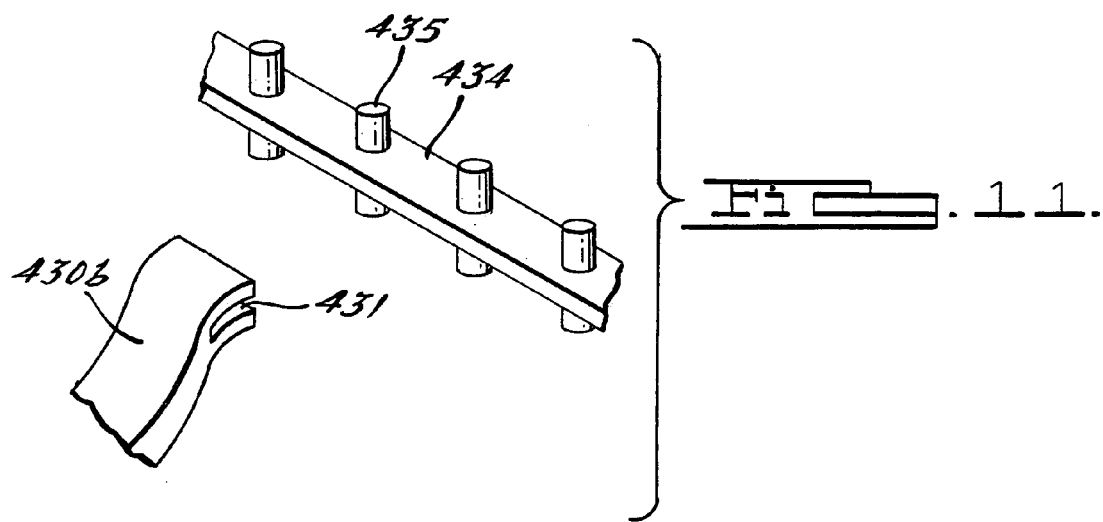
FIG. 11 illustrates a partial view of the tool of FIG. 9.
Figure 12:
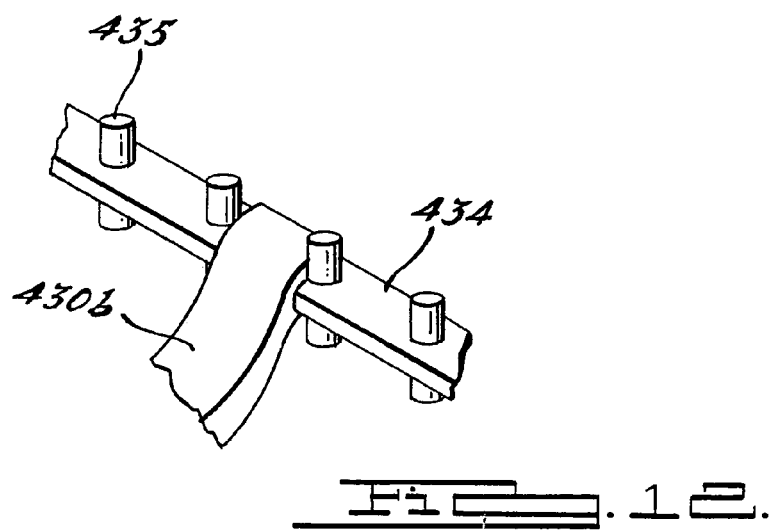
FIG. 12 illustrates a partial view of the tool of FIG. 9.

Turning now to FIG. 9, there is shown yet another embodiment of the present invention 410, wherein a bottom arm 414 is equipped with a clamping mechanism that comprises first and second calipers 430a and 430b hingedly attached to bottom arm 414 at hinges 440a and 440b, respectively. A hinged attachment bar 434 allows the calipers 430a and 430b to be swung around the exterior of a can to be drained, and locked there about to support the can during draining. FIG. 10 illustrates a side view of the clamping elements and bottom arm 414 of FIG. 9. FIGS. 11 and 12 illustrate close up views of locking bar 434 and one of the calipers 430b hingedly attached to bottom arm 414. As illustrated in FIGS. 11 and 12 locking bar 434 preferably includes a plurality of pegs, corresponding to a plurality of clamping positions for caliper 430b. In a preferred embodiment, caliper 430b may be positioned at varying locations between pegs 435 to accommodate cans of varying widths. A slot 431 formed in an end of caliper 430b is preferably fitted over support arm 434, and facilitates retention of the end of caliper 430b between pegs 435. Alternative methods of securing bar 434 might be used without departing from the scope of the present invention.

The present invention further comprises ornamental designs for a canned food draining tool. The designs are disclosed throughout the drawing Figures, but in particular are shown in FIGS. 10–18, which illustrate various views of tools shown in the preceding Figures. FIG. 10 illustrates a partial side view of the tool shown in FIG. 9. FIG. 11 illustrates a partial view of the tool of FIG. 9. FIG. 12 illustrates a partial view of the tool of FIG. 9. FIG. 13 illustrates a perspective view of the tool of FIG. 1. FIG. 14 illustrates a side view of the tool of FIG. 1. FIG. 15 illustrates a top view of the tool of FIG. 1. FIG. 16 illustrates a bottom view of the tool of FIG. 1. FIG. 17 illustrates a front end view of the tool of FIG. 1. FIG. 18 illustrates a rear end view of the tool of FIG. 1.

The present description is for illustrative purposes only, and should not be construed to narrow the breadth of the present invention in any way. Thus, those skilled in the art will appreciate that various modifications might be made to the presently disclosed embodiments without departing from the spirit and scope of the invention. Other aspects, features, and advantages will be apparent upon an examination of the attached drawing Figures and appended claims.

What is claimed is:

1. A tool for draining liquid from canned foods comprising:
    an elongate first arm having a hollow interior;
    a presser hingedly attached to the first arm;
    an elongate second arm hingedly attached to the first arm at an end thereof, the second arm including a substantially straight distal portion adapted to support a can beneath the presser, said second arm further including a substantially straight handle portion oriented substantially parallel the distal portion;
    a substantially rigid elongate connecting band is positioned in the hollow interior and connects the second arm with the presser for stabilization thereof;
    wherein the first and second arms are adapted for engaging about a can having the lid substantially detached therefrom, thereby bringing the presser into contact with the lid whereby a compressive force may be applied to the can to squeeze liquid from the contents thereof.

2. The tool of claim 1 wherein the first arm comprises a substantially rectangular member having an open side that receives an arcuate end of the second arm.

3. The tool of claim 2 wherein the second arm comprises a connecting portion disposed between the distal portion and handle portion, said connecting portion oriented at an angle relative to both of the distal portion and the handle portion.

4. The tool of claim 1 wherein the presser comprises a body and a detachable foot.

5. The tool of claim 4 further comprising a magnet attached to the foot.

6. The tool of claim 5 wherein the foot comprises a plurality of apertures formed therein.

7. A tool for draining liquid from canned foods comprising:
    an elongate first arm;
    a presser hingedly attached to the first arm, the presser comprises a body and a detachable foot, a pair of pegs attached to opposite sides of the body, the pegs adapted for removable attachment with a head via an angled slot formed therein;
    an elongate second arm hingedly attached to the first arm at an end thereof, the second arm including a substantially straight distal portion adapted to support a can beneath the presser, said second arm further including a substantially straight handle portion oriented substantially parallel the distal portion;

wherein the first and second arms are adapted for engaging about a can having the lid substantially detached therefrom, thereby bringing the presser into contact with the lid whereby a compressive force may be applied to the can to squeeze liquid from the contents thereof.

8. A tool for draining packing liquid from canned foods comprising:
 a substantially linear first arm having proximal and distal ends;
 a presser hingedly attached at the distal end of the first arm;
 a second arm having an arcuate end portion attached to the proximal end of the first arm with a hinge and a substantially linear end portion adapted to support a can beneath the presser;
 wherein the arcuate end portion of the second arm has a length and curvature such that the linear end portion is aligned substantially parallel with the first arm when the first and second arm are separated by a distance suitable for squeezing a can having a diameter greater than its height, wherein the height is less than about three inches.

9. The tool of claim 8 wherein the arcuate first end portion comprises a curvature greater than about 90°.

10. The tool of claim 9 wherein the second end portion is oriented substantially parallel the first arm when the linear end of the second arm is swung to a point about two inches from the presser.

11. A tool for draining the liquid from canned food comprising:
 a top arm with proximal and distal ends;
 a presser disposed at a distal end of the top arm;
 a bottom arm having a flat first portion for supporting a can beneath the presser, and further having a substantially linear second portion forming part of a squeezing handle in cooperation with the top arm, the flat first portion is separable from the second portion and engageable therewith at selectable longitudinal positions, the first portion thereby adapted to support cans having varying widths;
 wherein the top arm is attached to the bottom arm at its proximal end with a hinge.

12. The tool of claim 11 wherein the first portion comprises a V-shaped support.

13. The tool of claim 11 further comprising a plurality of pegs and mating apertures for selectively securing the first portion to the second portion.

14. The tool of claim 11 wherein the first portion comprises a substantially planar member that is selectively engageable with the second portion.

15. The tool of claim 14 wherein the first portion comprises a substantially circular platform.

16. A tool for draining the liquid from canned food comprising:
 a top arm with proximal and distal ends;
 a presser disposed at a distal end of the top arm;
 a bottom arm having a flat first portion for supporting a can beneath the presser, and further having a substantially linear second portion forming part of a squeezing handle in cooperation with the top arm;
 wherein the top arm is attached to the bottom arm at its proximal end with a hinge; and
 a pair of hinged arcuate calipers that are engageable about a can supported by the first portion.

17. The tool of claim 16 further comprising an attachment bar hingedly attached to a first of the calipers and selectively engageable with a second of the calipers to laterally constrain a can supported by the first portion.

18. A tool for draining the liquid from canned food comprising:
 a top arm with proximal and distal ends;
 a presser disposed at a distal end of the top arm;
 a bottom arm having a flat first portion for supporting a can beneath the presser, and
 further having a substantially linear second portion forming part of a squeezing handle in cooperation with the top arm, the first portion comprises a pair of parallel bars attached to the second portion;
 wherein the top arm is attached to the bottom arm at its proximal end with a hinge.

* * * * *

UNITED STATES PATENT AND TRADEMARK OFFICE
CERTIFICATE OF CORRECTION

PATENT NO. : 7,017,476 B2
DATED : March 28, 2006
INVENTOR(S) : Jason A. Squires

It is certified that error appears in the above-identified patent and that said Letters Patent is hereby corrected as shown below:

<u>Title page,</u>
Item [74], *Attorney, Agent, or Firm*, delete "Raggico" and insert -- Raggio -- before "& Dinnin, P.C.".

Signed and Sealed this

Twenty-third Day of May, 2006

JON W. DUDAS
*Director of the United States Patent and Trademark Office*